(12) United States Patent
Takei (10) Patent No.: US 6,965,401 B1
(45) Date of Patent: Nov. 15, 2005

(54) WHITE BALANCE CORRECTING DEVICE

(75) Inventor: Hirofumi Takei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 09/583,251

(22) Filed: May 31, 2000

(30) Foreign Application Priority Data

Jun. 4, 1999 (JP) ................................. 11-158564

(51) Int. Cl.$^7$ ............................................. H04N 9/73
(52) U.S. Cl. .................................................. 348/225.1
(58) Field of Search .......................... 348/223.1, 224.1, 348/225.1, 655, 656, 657; 382/162, 167

(56) References Cited

U.S. PATENT DOCUMENTS

| | | | | |
|---|---|---|---|---|
| 5,465,116 A | * | 11/1995 | Suzuki ..................... | 348/223.1 |
| 5,617,141 A | * | 4/1997 | Nishimura et al. ......... | 348/366 |
| 5,831,672 A | * | 11/1998 | Takei ....................... | 348/225.1 |

* cited by examiner

*Primary Examiner*—David L. Ometz
*Assistant Examiner*—Heather R. Long
(74) *Attorney, Agent, or Firm*—Cowan, Liebowitz & Latman, P.C.

(57) ABSTRACT

A white balance correcting device for correcting white balance by using video signals is arranged to be capable of accurately obtaining white balance even in a case where a picture includes only a small white part therein. The white balance correcting device is arranged to divide a picture into a plurality of blocks, to obtain a mean value of signals by averaging signals of each divided block as representing the block and a peak value of luminance from a signal having the highest luminance among others in each divided block also as representing the block, and to use, for white balance control, either the mean value or the peak value according to the state of the object of shooting.

15 Claims, 11 Drawing Sheets

WHITE OBJECT YW

BACKGROUND YG

WHITE BALANCE CORRECTING DEVICE

BACKGROUND OF THE INVENTION

1. Field of the Invention

The present invention relates to a white balance correcting device, a white balance correcting method and a storage medium for correcting white balance, which are suited for use in a video camera.

2. Description of Related Art

White balance correcting devices for video cameras of these days are mainly arranged to use the outputs of image sensors without using external sensors. Some of the known white balance correcting devices are arranged to avoid the adverse influence of chromatic colors as follows. Color-difference signals R-Y and B-Y and a luminance signal Y obtained from a signal processing circuit are divided into a number of small blocks corresponding to a picture. The signals within each of these divided blocks are averaged. Then, color signal components close to white are extracted from the mean values thus obtained. The white balance is controlled by bringing the mean values of the extracted color signal components into zero ("0").

Figure 8:
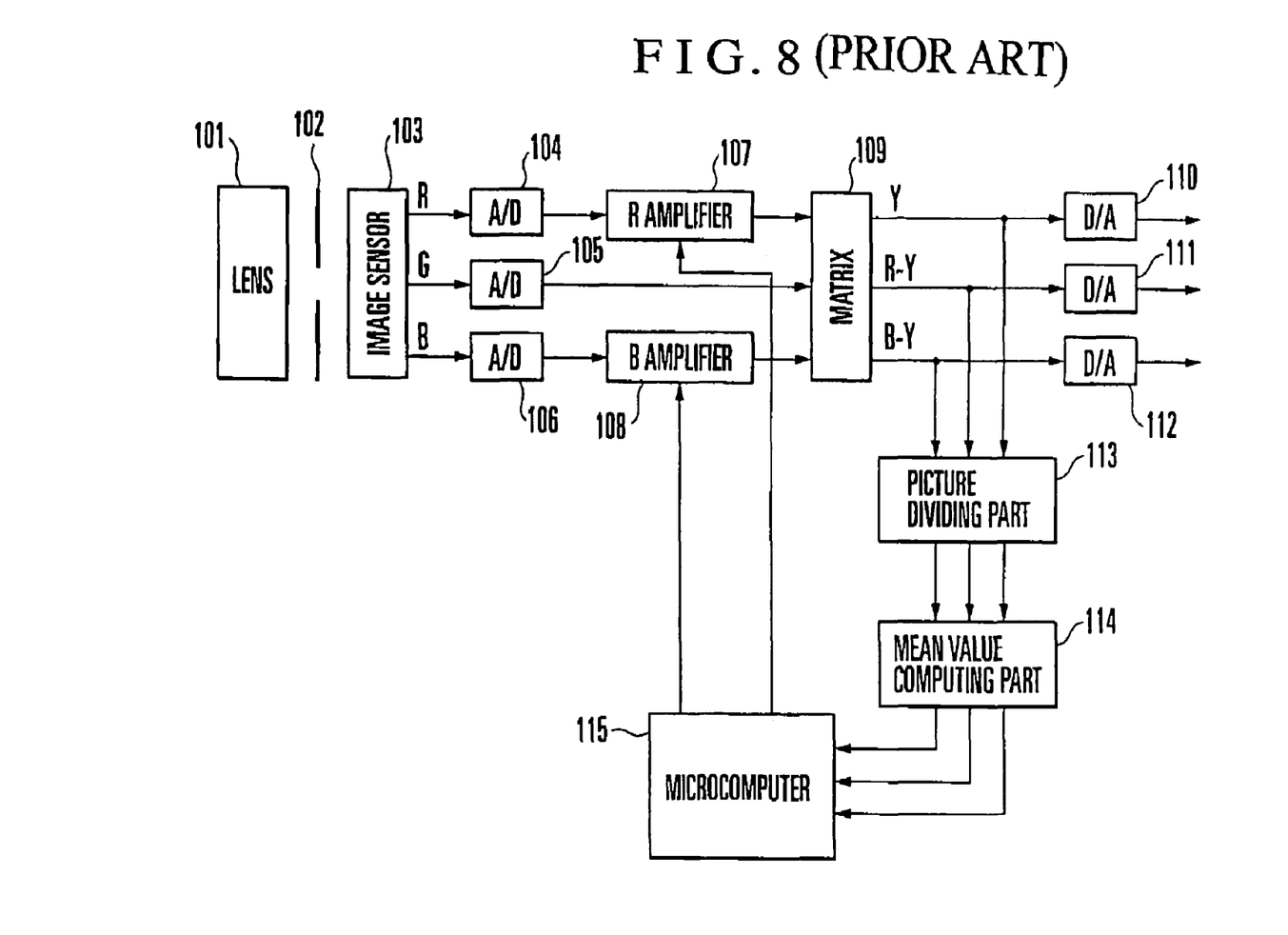
FIG. 8 is a block diagram showing the arrangement of a conventional image pickup apparatus.

FIG. 8 is a block diagram showing, by way of example, the arrangment of an image pickup apparatus having a conventional white balance correcting device. Referring to FIG. 8, an object image having passed through a lens 101 and an iris 102 is formed on an image sensor 103. The image sensor 103 outputs signals of primary colors R (red), G (green) and B (blue) obtained by photoelectric conversion. The R, G and B signals are sent respectively to A/D converters 104, 105 and 106 to be converted into digital signals. The R and B digital signals are respectively sent to white balance amplifiers 107 and 108 to have their gains controlled on the basis of control signals supplied from a microcomputer 115. The R and B signals processed by the white balance amplifiers 107 and 108 and the G signal from the A/D converter 105 are sent to a matrix circuit 109. The matrix circuit 109 is arranged to form a luminance signal Y and color-difference signals R-Y and B-Y from the R, G and B signals. The luminance signal Y and the color-difference signals R-Y and B-Y are sent respectively to D/A converters 110, 111 and 112 to be converted into analog signals. The analog signals thus obtained are sent to an encoder (not shown) which is arranged to convert these input signals into standard TV signals. The TV signals from the encoder are sent out from the encoder either to be displayed on a monitor or to be supplied to a magnetic recording apparatus. Some of such recording apparatuses are arranged to record these signals in the form of the digital signals without having them converted into the analog form.

Figure 9:
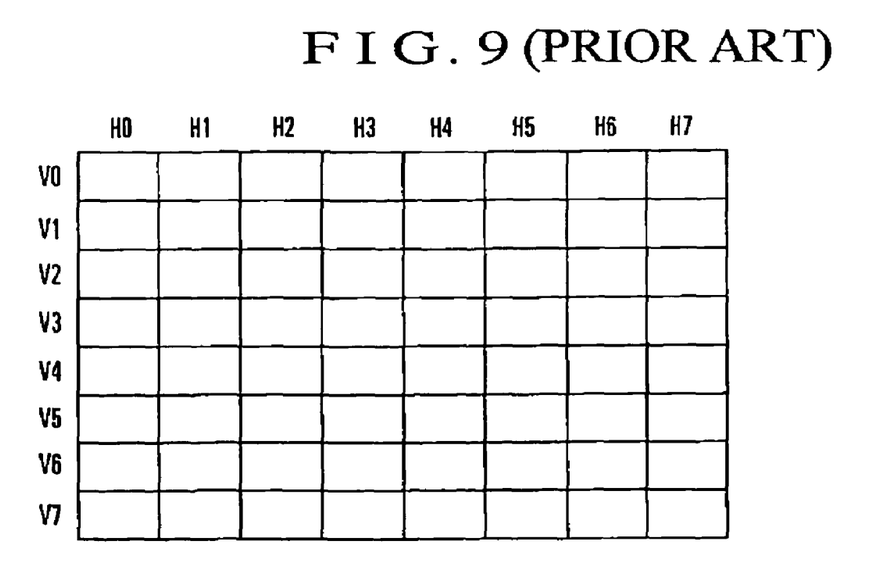
FIG. 9 is a diagram showing a picture divided into a plurality of blocks.

Meanwhile, the signals Y, R-Y and B-Y from the matrix circuit 109 are also supplied to a picture dividing part 113. The picture dividing part 113 is arranged to divide one picture amount of each of the signals Y, R-Y and B-Y into 8 vertical sections and 8 horizontal sections to give a total of 64 blocks, as shown in FIG. 9. A mean value computing part 114 computes and obtains the mean value of each of the signals Y, R-Y and B-Y for every divided block. The 64 sets of the signals Y, R-Y and B-Y are sent from the mean value computing part 114 to the microcomputer 115. At the microcomputer 115, only the signals of such blocks that the values of the color-difference signal and luminance signal are within a certain range are extracted (i.e., the so-called white extracting process is performed), and only the signals thus extracted are integrated. This extracting range is as shown, by way of example, in FIG. 10.

Figure 10:
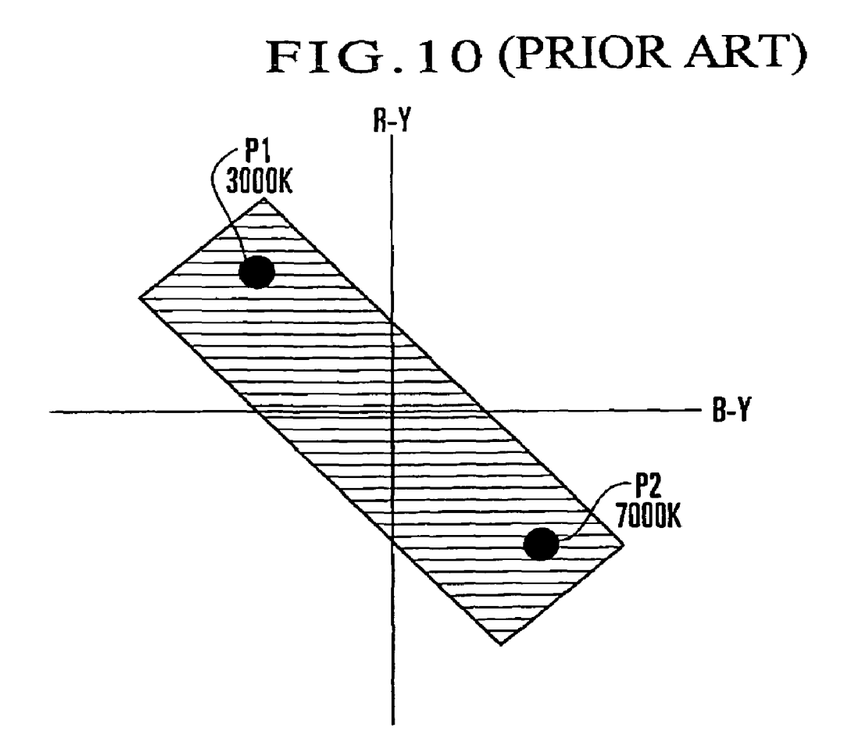
FIG. 10 is a color-difference signal vector diagram showing a white extracting range.

FIG. 10 is a diagram showing the variation of vectors of the color-difference signals taking place as a result of changes in color temperature of an object of achromatic color with the signal R-Y on the ordinate axis and the signal B-Y on the abscissa axis. In a case where white balance has been attained when color temperature is 7000 K which corresponds to an outdoor condition, the color-difference signals are located at a point P1 in photo-taking indoors with an incandescent lamp (at about 3000 K). Conversely, when white balance has been attained indoors with the incandescent lamp, the color-difference signals are located at a point P2 in photo-taking outdoors (at about 7000 k). In other words, the changes of color-difference signals with the color temperature of an achromatic object take place within a hatched part shown in FIG. 10. Assuming that white balance is to be controlled within a practicable range of color temperature from 3000 K to 7000 K, the white balance control can be accomplished by using signals within an area represented by the hatched part shown in FIG. 10. Hereinafter, this area will be called a white extracting range. Further, since white balance obtained under the light of a fluorescent lamp which is tinged with green in spectrum is taken into consideration, a white extracting area employed generally somewhat spreads in the direction of the color G. Furthermore, restrictions are sometimes imposed on the luminance signal Y in addition to the restriction on the color-difference signals. For example, such a restriction is imposed on the luminance signal Y that the level of the luminance signal Y is required to be equal to or greater than 50 IRE which is 50% of standard luminance of the luminance signal Y.

The microcomputer 115 extracts only the signals of blocks in which the color-difference signals are within the above-stated white extracting area and the level of the luminance signal is at least 50 IRE, and then computes mean values of the thus-extracted color-difference signals. Then, the microcomputer 115 corrects the white balance by sending to the white balance amplifiers 107 and 108 such control signals that cause the mean values of the color-difference signals R-Y and B-Y to become "0".

However, the conventional arrangement described above has presented the following problems.

Figure 11:
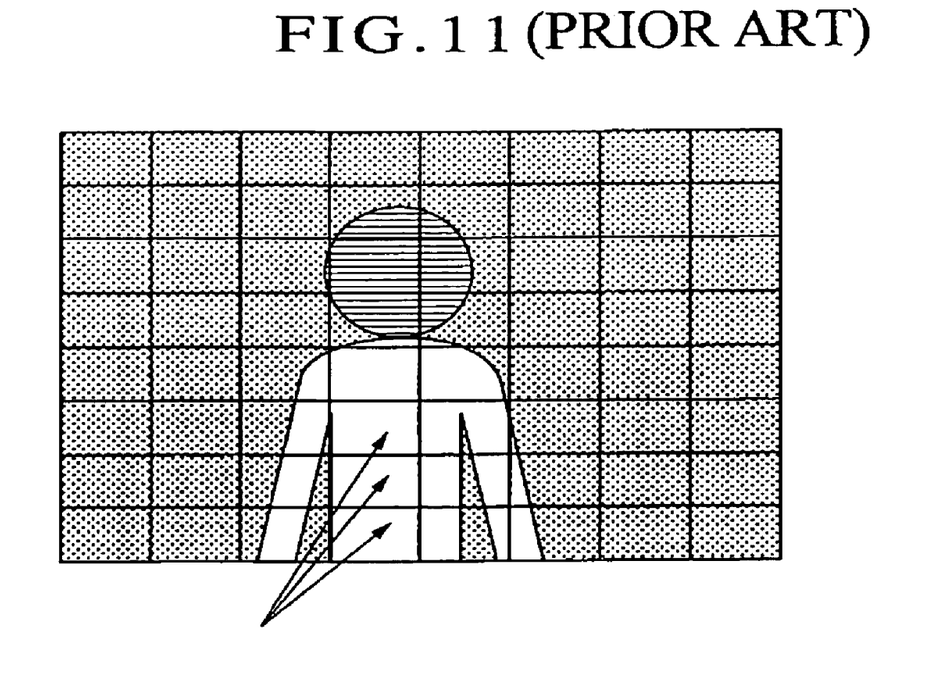
FIG. 11 is a diagram showing an object image and the block-divided picture.
Figure 12:
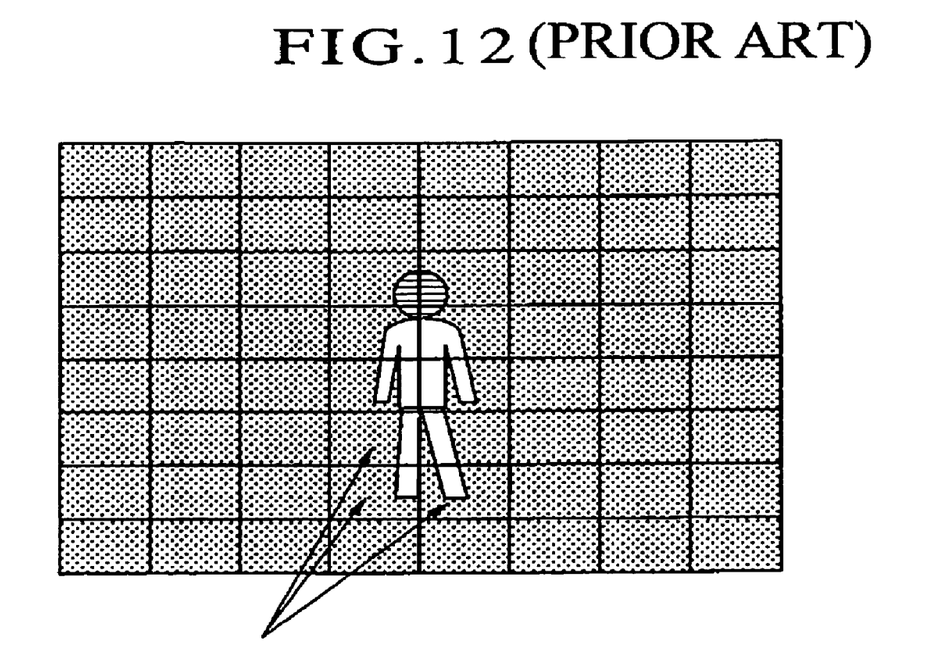
FIG. 12 is a diagram showing another object image and the block-divided picture.

While a shooting object having a white portion largely distributed presents no problem, it is apt to be difficult to accurately extract white from such an object that has a white part finely distributed on a picture. FIGS. 11 and 12 are diagrams showing the respective objects on the picture for the purpose of explaining this problem. FIG. 11 shows the state of a block-divided picture on which a large image of a person in white clothes appears with a background of chromatic color. In this case, a white part of the image largely exists within the divided blocks indicated by arrows in FIG. 11. Therefore, if the color-difference signals are averaged within each of the divided blocks, white can be accurately extracted.

FIG. 12, on the other hand, shows a small image of the person in white clothes on the picture. The white part of the image does not much exist within the divided blocks as indicated by arrows in FIG. 12. Therefore, the white color and the color of the background are commingled when the signals within each of the divided blocks are averaged. In that case, the white extraction cannot be accurately accomplished. Assuming that the background is in a green color of turfs, the white part of the object and the green of the background mix together to result in a light green color, which prevents accurate white extraction in the event of the small white part in the divided blocks as shown in FIG. 12, although the white extraction can be accurately accomplished in the case of large white parts as shown in FIG. 11.

Figure 13:
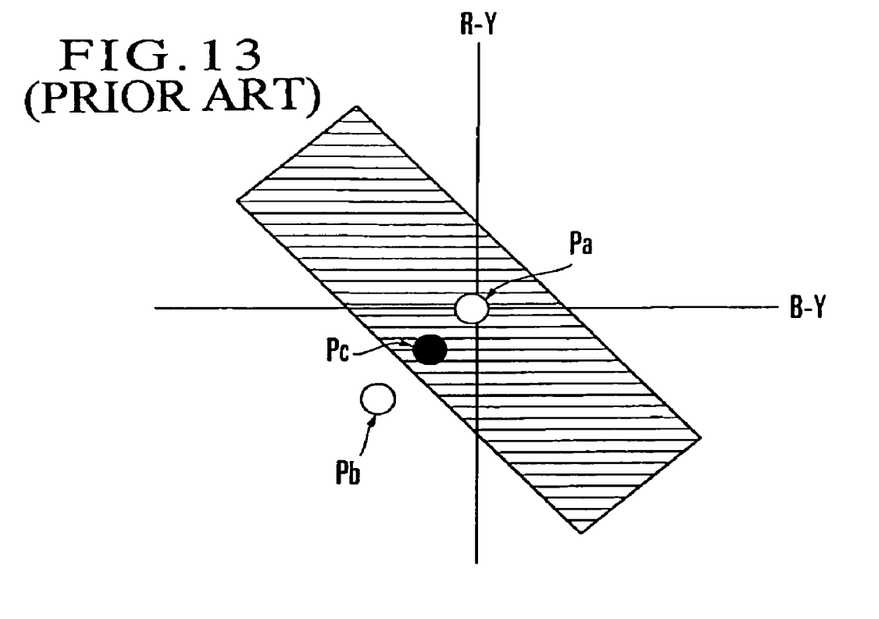
FIG. 13 is a color-difference signal vector diagram showing color-difference signals to be inputted into a microcomputer of the conventional image pickup apparatus.
Figure 14:
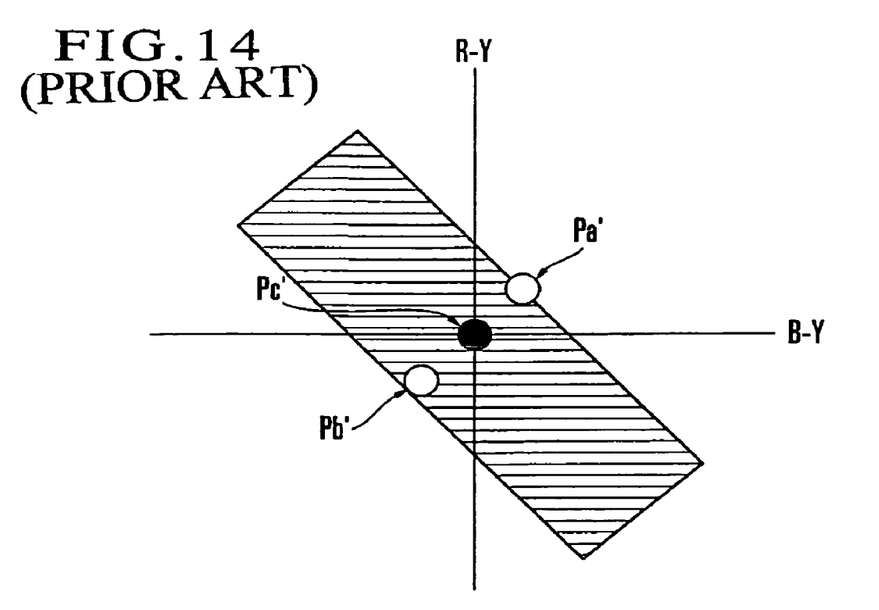
FIG. 14 is a color-difference signal vector diagram showing color-difference signals obtained after the white balance correction in the conventional image pickup apparatus.

FIG. 13 is a color-difference signal vector diagram showing how colors are commingling in the case of the object shown in FIG. 12. The white clothing point Pa and the green background point Pb are caused to commingle by the averaging of the inside of each divided block. At the time when the microcomputer 115 reads signals, the two different colors commingle into a light green color point Pc. Since this point Pc is located within the above-stated white extracting range, the microcomputer 115 attempts to correct and make this point Pc white. FIG. 14 is a color-difference signal vector diagram showing a state obtained by the white balance correction. After the white balance correction, the light green color point Pc has become a white-balance-corrected point Pc'. The position of the point Pc' is corrected at the center of vectors. Then, the white clothing point Pa of the object is erroneously corrected to a point Pa', and the green background point Pb is also erroneously corrected to a point Pb', as shown in FIG. 14. As a result of this white balance correction, the white clothing of the object comes to be tinged with a purplish color while the green color of the background becomes a lighter green color. Such an erroneous color correction has presented a problem.

Another problem of the prior art lies in that, although the above-stated problem may be mitigated by arranging the picture to be divided into more finely divided areas, such an arrangement not only causes an increase in size of the circuit arrangement, but also makes a period of time required for computing processes longer.

BRIEF SUMMARY OF THE INVENTION

In view of the problems of the prior art, it is an object of the invention to provide a white balance correcting device, a white balance correcting method or a storage medium for correcting white balance, which are arranged to be capable of accurately giving apposite white balance even in a case where a picture includes only a small white part.

To attain the above object, in accordance with an aspect of the invention, there is provided a white balance correcting device for correcting white balance of a picked-up image, comprising mean value calculating means for dividing an image picking-up plane into a plurality of blocks and calculating a mean value of video signals obtained in each of the plurality of blocks, peak value acquiring means for acquiring a peak value of video signals obtained in each of the plurality of blocks, selection means for selecting one of the value obtained by the mean value calculating means and the value obtained by the peak value acquiring means, and white balance control means for controlling white balance on the basis of the value selected by the selection means.

In accordance with another aspect of the invention, there is provided a white balance correcting device for correcting white balance of a picked-up image, comprising mean value calculating means for calculating a mean value of inputted video signals, peak value acquiring means for acquiring a peak value of the inputted video signals, selection means for selecting one of the value obtained by the mean value calculating means and the value obtained by the peak value acquiring means, and white balance control means for controlling white balance on the basis of the value selected by the selection means.

In accordance with a further aspect of the invention, there is provided a white balance correcting method for correcting white balance of a picked-up image, comprising a mean value calculating step of dividing an image picking-up plane into a plurality of blocks and calculating a mean value of video signals obtained in each of the plurality of blocks, a peak value acquiring step of acquiring a peak value of video signals obtained in each of the plurality of blocks, a selection step of selecting one of the value obtained by the mean value calculating step and the value obtained by the peak value acquiring step, and a white balance control step of controlling white balance on the basis of the value selected by the selection step.

In accordance with a still further aspect of the invention, there is provided a white balance correcting method for correcting white balance of a picked-up image, comprising a mean value calculating step of calculating a mean value of inputted video signals, a peak value acquiring step of acquiring a peak value of the inputted video signals, a selection step of selecting one of the value obtained by the mean value calculating step and the value obtained by the peak value acquiring step, and a white balance control step of controlling white balance on the basis of the value selected by the selection step.

In accordance with a still further aspect of the invention, there is provided a storage medium which stores therein a program for executing a process for correcting white balance of a picked-up image, the process comprising dividing an image picking-up plane into a plurality of blocks, calculating a mean value of video signals obtained in each of the plurality of blocks, acquiring a peak value of video signals obtained in each of the plurality of blocks, selecting one of the calculated mean value and the acquired peak value, and controlling white balance on the basis of the selected one of the calculated mean value and the acquired peak value.

In accordance with a still further aspect of the invention, there is provided a storage medium which stores therein a program for executing a process for correcting white balance of a picked-up image, the process comprising calculating a mean value of inputted video signals, acquiring a peak value of the inputted video signals, selecting one of the calculated mean value and the acquired peak value, and controlling white balance on the basis of the selected one of the calculated mean value and the acquired peak value.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
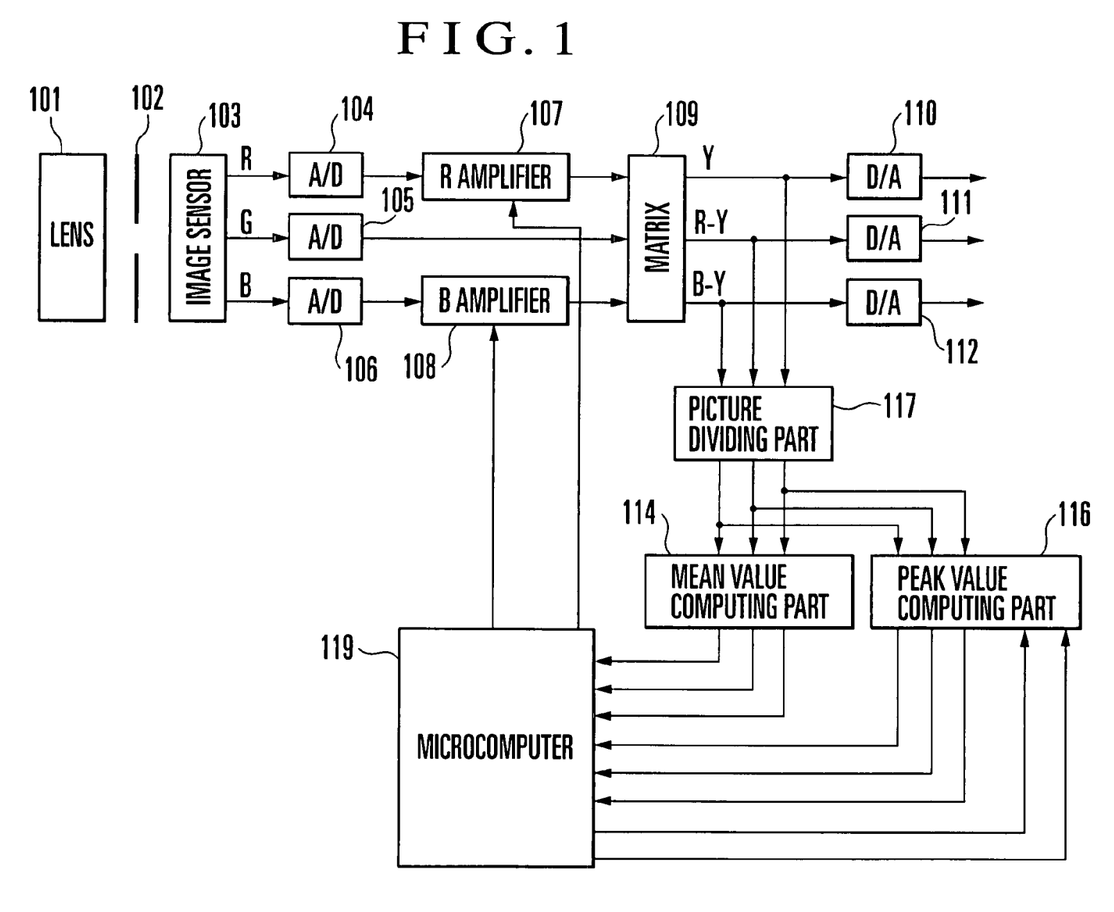
FIG. 1 is a block diagram showing the arrangement of an image pickup apparatus having a White balance correcting device according to an embodiment of the invention.
Figure 2:
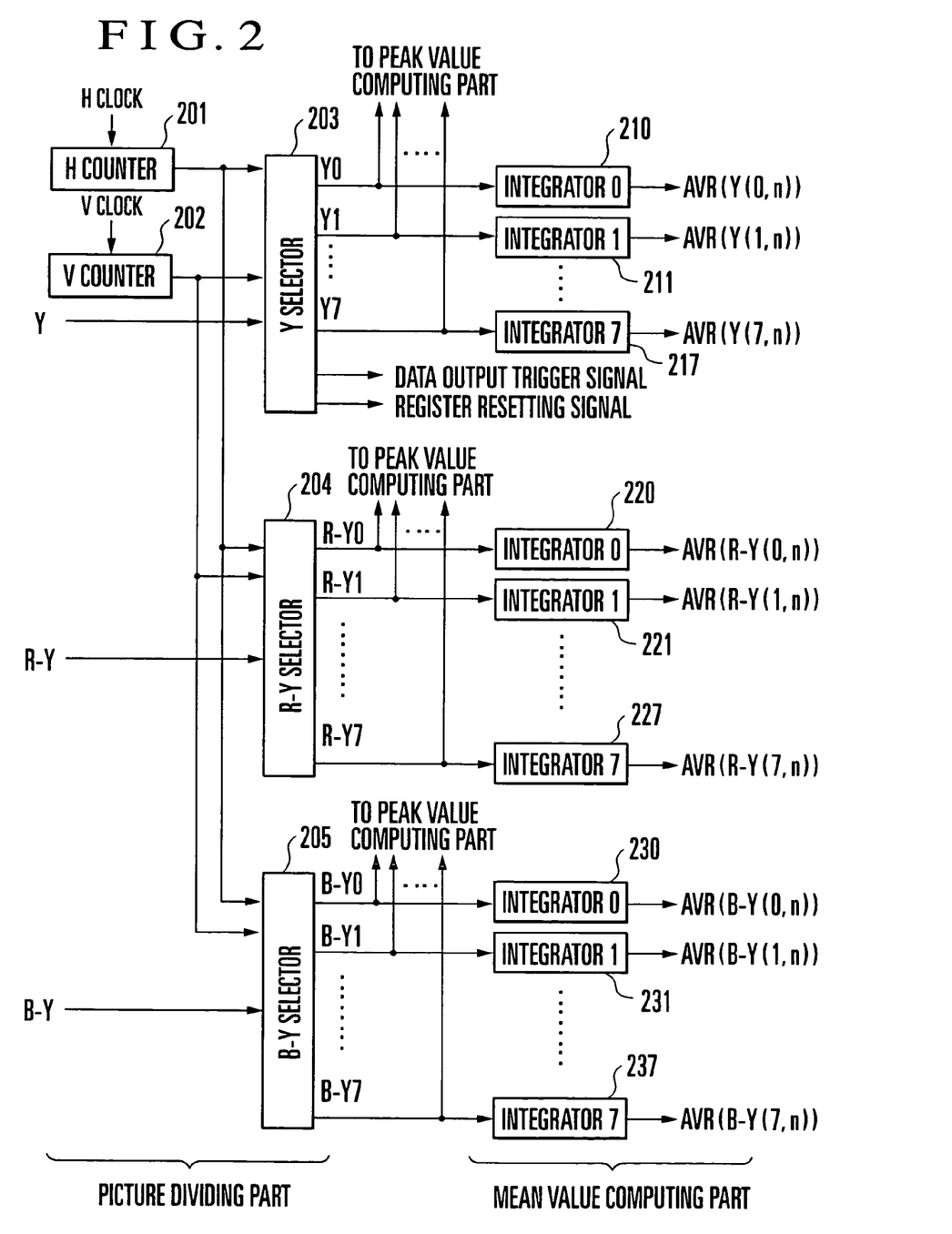
FIG. 2 is a block diagram showing the arrangement of a picture dividing part and the arrangement of a mean value computing part.

FIG. 1 is a block diagram showing the arrangement of an image pickup apparatus having a white balance correcting device according to the embodiment of the invention. In FIG. 1, all parts that function in the same manner as the parts of the conventional apparatus shown in FIG. 8 are denoted by the same reference numerals as in FIG. 8, and the details of them are omitted from the following description. The actions of a picture dividing part 117 shown in FIG. 1 are first described below. FIG. 2 is a block diagram showing the arrangement of the picture dividing part 117.

Referring to FIG. 2, a Y selector 203 acts to output a Y signal input from its terminal Y0 when one effective horizontal scanning period begins. A horizontal counter (H counter) 201 is arranged to count the pulses of a horizontal clock signal and to send a control signal to the Y selector 203 after the lapse of ⅛ of one effective horizontal scanning period. The control signal causes the Y selector 203 to output another Y signal input from a terminal Y1. The Y selector 203 is thus arranged to output the Y signal inputs one after another by changing use of its output terminals from one over to another, in such a way as to finish the Y signal output from its terminal 7 at the end of one effective horizontal scanning period.

Upon commencement of the next effective horizontal scanning period, the Y selector 203 again selects the terminal Y0. In the meantime, a vertical counter (V counter) 202 counts horizontal scanning lines and outputs, after the lapse of ⅛ of one effective vertical scanning period, a data output trigger signal to cause the signals of integrators and registers to be sent to a microcomputer 115 and also a register reset signal for resetting the integrators and the registers after outputting data.

After the above-stated action, the Y selector 203 acts again to output a Y signal input from the terminal Y0 upon commencement of the next one effective horizontal scanning period. Then, after the lapse of the next ⅛ of the effective vertical scanning period, the data output trigger signal and the register reset signal are sent out. This action, i.e., a dividing action, is likewise performed also by an R-Y selector 204 and a B-Y selector 205. With the signals changed from one signal over to another for one picture in the above manner, data of one picture is divided into 8×8 blocks, i.e., 64 blocks.

Integrators 210 to 237 shown in FIG. 2 constitute a mean value computing part 114 shown in FIG. 1. The mean value computing part 114 integrates one block amount of signals supplied from each of the selectors 203, 204 and 205. After the integrated signals are sent as mean data to the microcomputer 119 in response to the data output trigger signal, the mean value computing part 114 is reset by the register reset signal.

Block mean value signals to be outputted from the mean value computing part 114 include Y signals AVR(Y(0, n)) to AVR(Y(7, n)), R-Y signals AVR(R-Y(0, n) to AVR(R-Y(7, n)) and B-Y signals AVR(B-Y(0, n)) to AVR(B-Y( 7, n)). In these signal symbols, "n" represents line numbers in the vertical direction and numerals represent column numbers in the horizontal direction. A total of 64 block mean values of one picture are obtained for each of the Y, R-Y and B-Y signals.

Figure 3A:
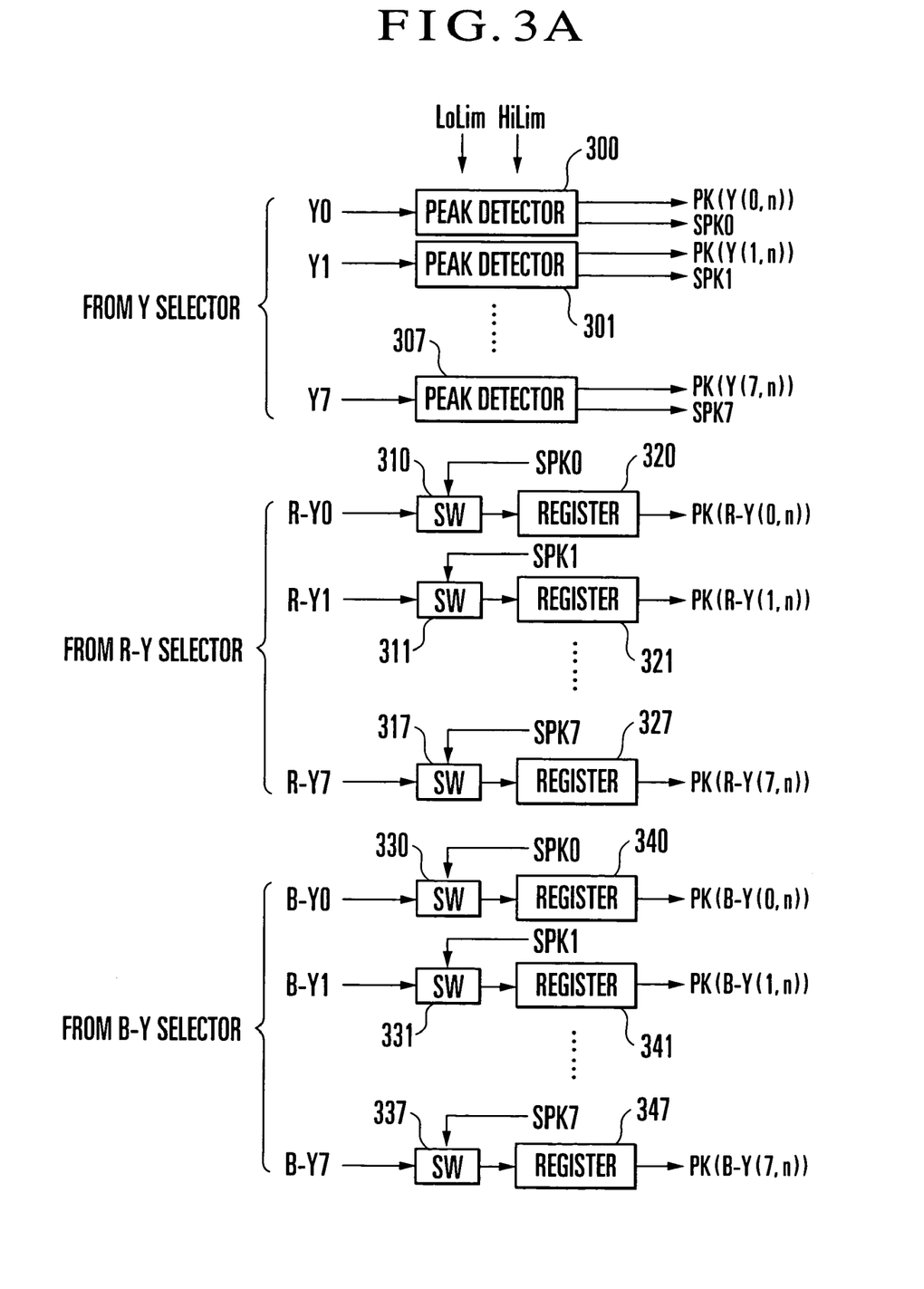
FIG. 3A is a block diagram showing the arrangement of a peak value computing part.
Figure 4:
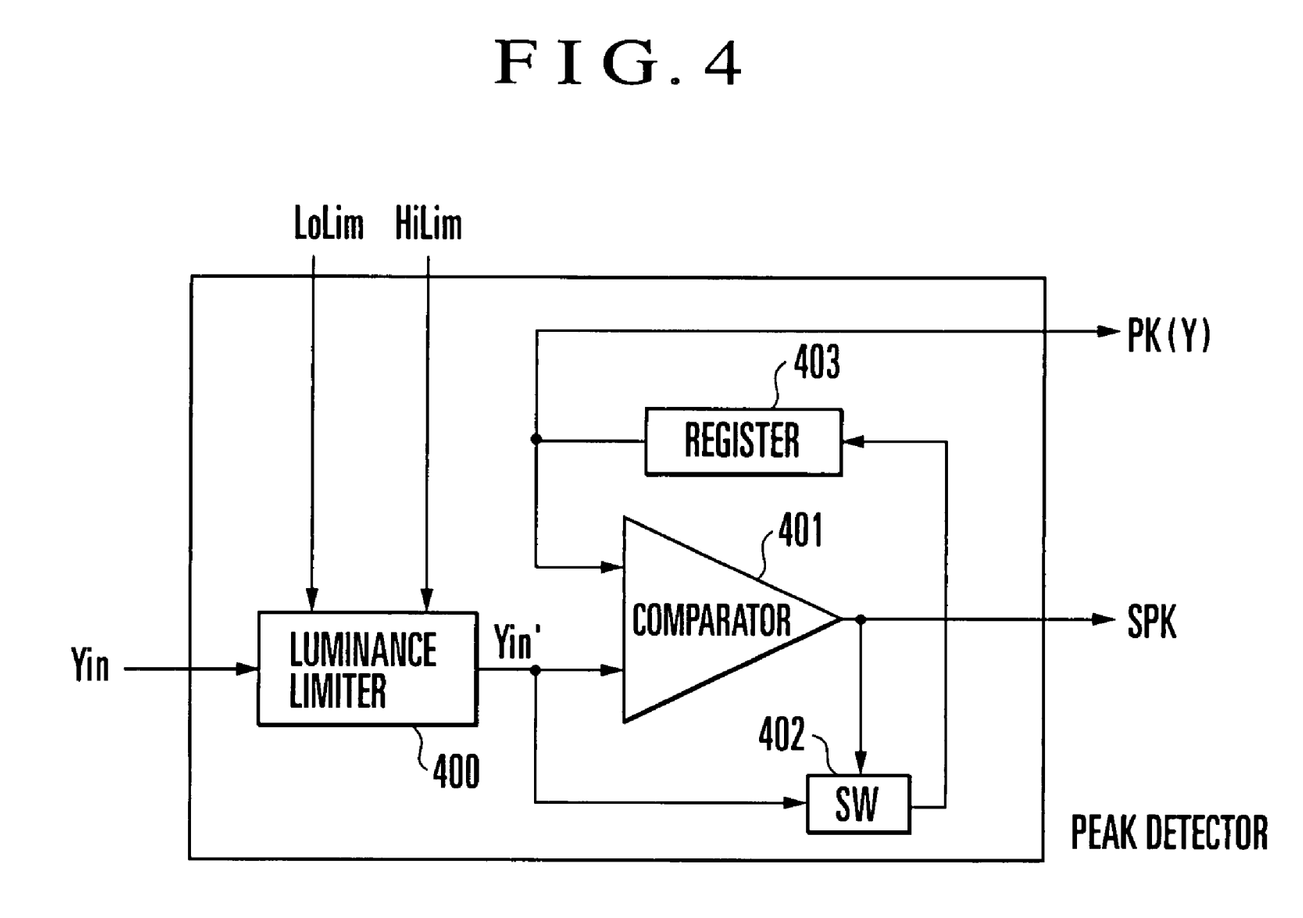
FIG. 4 is a block diagram showing the arrangement of a luminance peak detector.

FIG. 3A is a block diagram showing the arrangement of a block-luminance-peak-signal extracting part, which is the peak value computing part 116 shown in FIG. 1. Referring to FIG. 3A, peak detectors 300 to 307 are arranged to detect the luminance peak of each of the divided blocks. The details of each of the peak detectors 300 to 307 are shown in FIG. 4. Referring to FIG. 4, a signal inputted to the peak detector is supplied to a luminance limiter 400. The luminance limiter 400 allows to pass only signals of such luminance levels that are between levels HiLim and LoLim indicative respectively of the upper limit and lower limit of the luminance level, which are set under the control of the microcomputer 119. The upper limit and the lower limit of the luminance level are set for the purpose of removing such an abnormally high luminance that color-difference signals cannot be correctly obtained and such a low luminance that there is little probability of having any white object.

A signal Yin' having passed through the luminance limiter 400 is sent to a comparator 401 and a switch 402. The comparator 401 is arranged to receive the output of a register 403 in which the Y signal which has passed the switch 402 up to the current time is stored. The comparator 401 compares the currently inputted Y signal Yin' with the level PK(Y) of the Y signal stored in the register 403. If the level of the Y signal Yin' is found to be higher than the level PK(Y), the comparator 401 outputs a switch control signal SPK at a high level. When the level of the switch control signal SPK becomes high, the switch 402 allows the Y signal Yin' to pass there and to enter the register 403. Then, the content of the register 403 becomes the same as the value of the signal Yin'. This action is performed on all luminance signals within the block inputted. As a result, the register 403 comes to store the largest of luminance signals within each of the divided blocks when the last horizontal scanning line of the block is obtained. Meanwhile, the switch control signal SPK is sent also to the outside. The signal having the highest (largest) luminance among others within each of the divided blocks is obtained when the level of the switch control signal SPK last becomes high between the first horizontal scanning line and the last horizontal scanning line of the same block.

For the Y signal, the peak luminance value of each block is detected by the peak detectors 300 to 307. For the color-difference signal R-Y, peak detectors which are similar to the peak detector shown in FIG. 4 are arranged also to output switch control signals SPK. When the level of the switch control signal SPK0 becomes high, a switch 310 is caused to allow the R-Y signal R-Y0 to pass there to be stored in a register 320. Then, at a point of time when the data output trigger signal is inputted to the register 320, an R-Y signal of the same part where the largest of luminance values between the first and last horizontal scanning lines is obtained comes to be stored in the register 320. This action is performed on each of the R-Y signals R-Y0 to R-Y7. Further, an action similar to the above action is also performed on the color-difference signal B-Y. The values stored at these registers are sent as peak value data to the microcomputer 119 according to the data output trigger signals in the same manner as the mean value computing part 114 mentioned in the foregoing. After that, the peak value computing part 116 (block-luminance-peak-signal extracting part) is reset by the register reset signal.

The block peak signals to be outputted from the peak value computing part 116 shown in FIG. 3A include Y signals PK(Y(0, n)) to PK(Y(7, n)), R-Y signals PK(R-Y(0, n)) to PK(R-Y(7, n)) and B-Y signals PK(B-Y(0, n)) to PK(B-Y( 7, n)). In these signal symbols, "n" represents line numbers in the vertical direction and numerals represent column numbers in the horizontal direction. A total of 64 sets of peak value data (Y, R-Y and B-Y) are thus obtained per picture.

As mentioned above, with one picture divided into 64 blocks, 64 sets of mean value signals and 64 sets of peak value signals are supplied to the microcomputer 119.

Figure 3B:
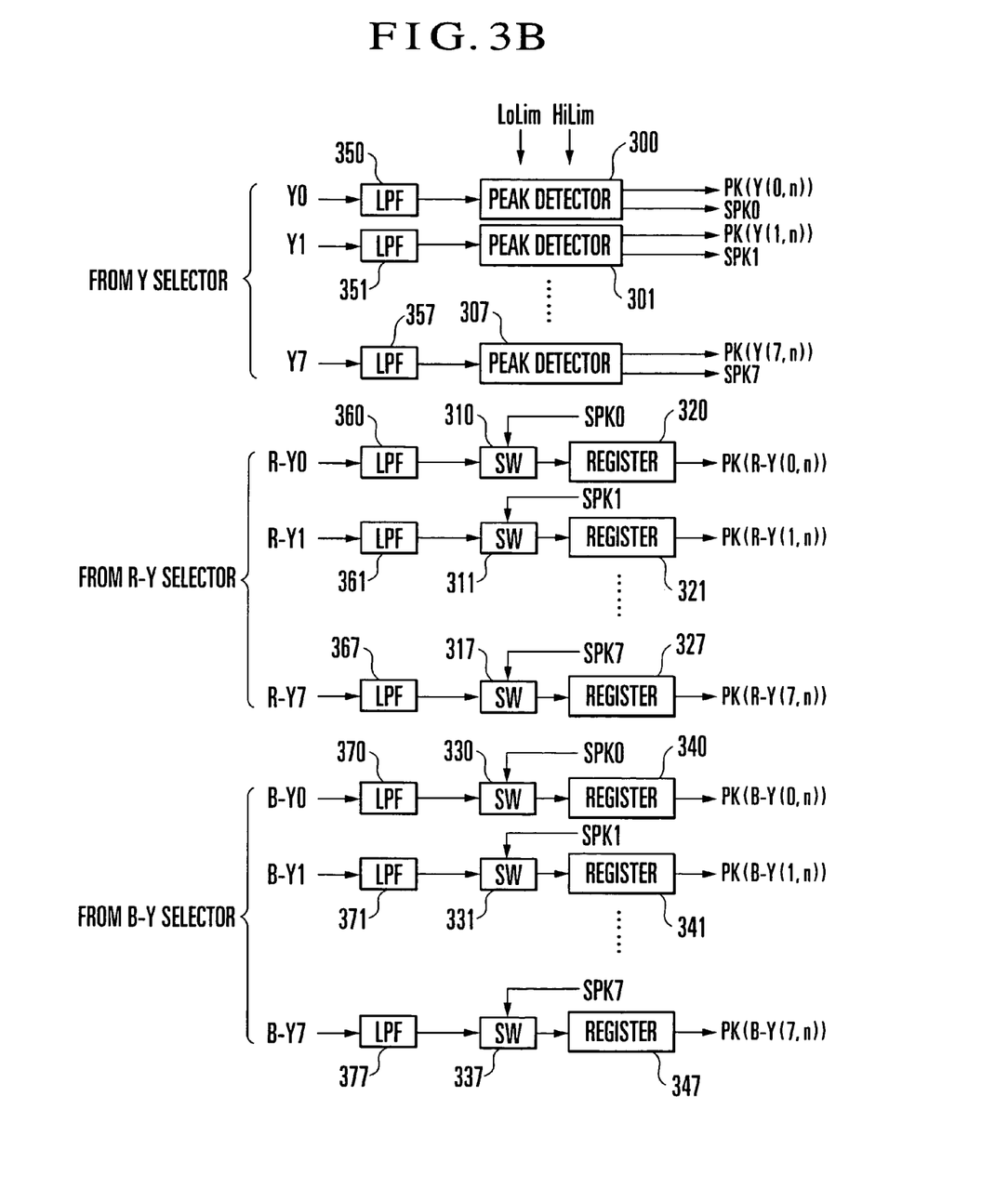
FIG. 3B is a block diagram showing the arrangement of a peak value computing part in which low-pass filters are installed.

Incidentally, as shown in FIG. 3B, low-pass filters 350 to 377 may be inserted in detecting the peak values of the luminance signals and the color-difference signals. The use of the low-pass filters 350 to 377 as shown in FIG. 3B lessens adverse effects of abnormal luminance and color-difference peak signals resulting from a malfunction of the image sensor, abnormal reflection, etc.

Figure 5:
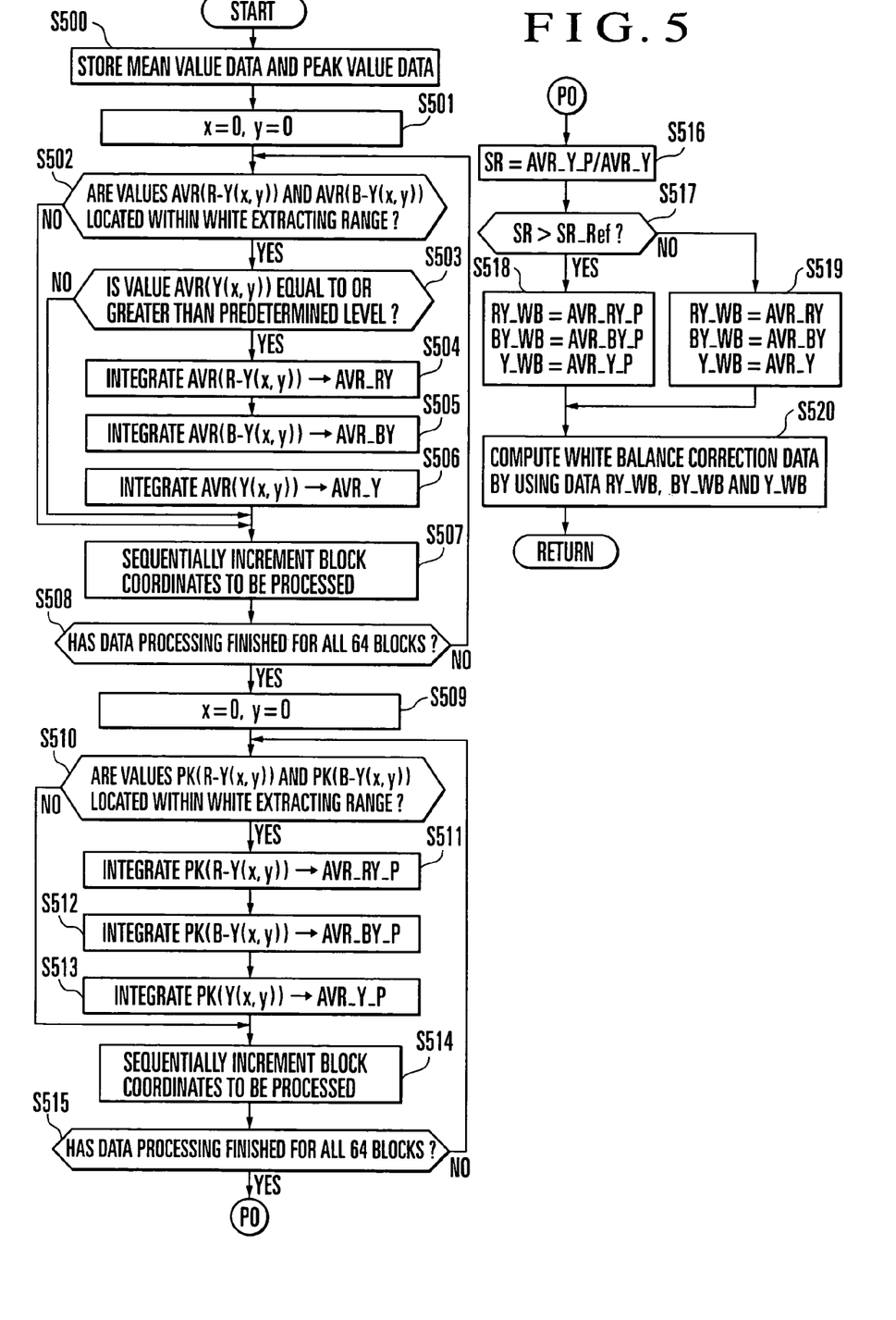
FIG. 5 is a flow chart showing the operation of a microcomputer included in the image pickup apparatus shown in FIG. 1.

A flow of processes to be executed within the microcomputer 119 is next described. FIG. 5 is a flow chart showing the flow of processes in the microcomputer 119.

Referring to FIG. 5, at step S500, 64 sets of mean value data of the luminance and color-difference signals and 64 sets of peak value data of the luminance and color-difference signals are first taken in a memory of the microcomputer 119. At the next step S501, a block horizontal coordinate value x and a block vertical coordinate value y for serially processing the 64 sets of data one by one are reset.

At step S502, a check is made for the values of the color-difference signal components AVR(R-Y(x, y)) and AVR(B-Y(x, y)) of the mean value data to find if they are within the white extracting range. If so, the flow proceeds to step S503. If not, the flow proceeds to step S507.

At the step S503, a check is made to find if the luminance signal mean value AVR(Y(x, y)) of the same block is equal to or larger than a predetermined level. This step is provided for excluding a low luminance value, because any object that has excessively low luminance is not likely to be white in color. Therefore, the predetermined level is, for example, set at 20 IRE.

When the results of both the checks made at the steps S502 and S503 are YES, the data is considered to satisfy the white extracting condition, and the flow proceeds to step S504. At the step S504, the mean value AVR(R-Y(x, y)) of the color-difference signal R-Y which has passed the checks is integrated as integral data. At step S505, the mean value AVR(B-Y(x, y)) of the color-difference signal B-Y which has been found to meet the white extracting condition is also integrated as integral data. At step S506, the mean value AVR(Y(x, y)) of the luminance signal Y found to meet the white extracting condition is also integrated as integral data.

Meanwhile, all data found not to meet the white extracting condition at the steps S502 and S503 are not subjected to the integrating processes of the steps S504, S505 and S506.

At the step S507, the coordinates of blocks to be taken in for the next processes are serially incremented one after another. The coordinates are first incremented, for example, as (x, y)=(0, 0), (1, 0), (2, 0) - - - (7, 0), for the uppermost line in the block-divided picture shown in FIG. 9. The increment is next made as (x, y)=(0, 1), (1, 1), (2, 1) - - - (7, 1), for the second line in the block-divided picture shown in FIG. 9. The process is carried on to eventually increment the coordinates as (x, y)=(0, 7), (1, 7), (2, 7) - - - (7, 7), up to the last block coordinates. The steps S502 to S507 are executed until all data of 64 blocks are found by a check made at step S508 to have been processed.

With data of all the blocks found at the step S508 to have been completely processed, the flow proceeds from the step S508 to step S509. At the step S509, the block coordinates are again reset for processing the groups of peak value data (x=0 and y=0). At step S510, a check is made to find if the data of color-difference signals PK(R-Y(x, y)) and PK(B-Y (x, y) which correspond to the luminance (Y) peak of each of the blocks are within the white extracting range shown in FIG. 10. If so, the flow proceeds from the step S510 to step S511.

At the step S511, the peak value PK(R-Y(x, y)) of the color-difference signal R-Y which has passed the check is integrated as integral data. At step S512, the peak value PK(B-Y(x, y)) of the color-difference signal B-Y found to meet the white extracting condition is integrated as integral data. At step S513, the peak value PK(Y(x, y)) of the luminance signal Y found to meet the white extracting condition is integrated also as integral data. In checking the peak values for white extraction, the luminance level is not checked to find if it is equal to or larger than a predetermined level, unlike at the step S503, because the luminance level of the Y signal has been restricted to a range between the lower limit LoLim and the upper limit HiLim by the luminance limiter 400 as mentioned above (see FIG. 4).

Upon completion of the integrating processes on the peak values of the luminance signal and color-difference signals which have passed the above-stated check, the flow proceeds to step S514. At the step S514, the block coordinates are incremented for a block to be next processed in the same manner as the mean value processing step S507. The white extracting and integrating processes are repeated until all the peak value data of 64 blocks are found at step S515 to have been processed. Upon completion of the processes on all the 64 blocks, the flow proceeds from the step S515 to step S516 for the next process.

At the step S516, a luminance ratio SR of the integral value AVR_Y_P of peak values of the luminance signal to the integral value AVR_Y of mean values of the luminance signal obtained through the white extraction is computed. At the next step S517, a check is made to find if the luminance ratio SR is larger than a reference value SR_Ref. If so, i.e., if the integral value of peak values of the luminance signal is not less than a predetermined number of times the integral value of mean values of the luminance signal, the flow proceeds to step S518. At the step S518, the integral values AVR_RY_P and AVR_BY_P of peak values of the color-difference signals are substituted for white balance computing color-difference data RY_WB and BY_WB, respectively. Further, the integral value AVR_Y_P of peak values of the luminance signal is substituted for white balance computing luminance data Y_WB.

If the luminance ratio SR is found at the step S517 to be smaller than the reference value SR_Ref, i.e., if the integral value of peak values of the luminance signal is less than the predetermined number of times the integral value of mean values of the luminance signal, the flow proceeds from the step S517 to step S519. At the step S519, the integral values AVR_RY and AVR_BY of mean values of the color-difference signals are substituted for the white balance computing color-difference data RY_WB and BY_WB, respectively. Further, the integral value AVR_Y of mean values of the luminance signal is substituted for the white balance computing luminance data Y_WB. With either the mean value data or peak value data thus stored as the white balance computing color-difference and luminance data, the flow proceeds to step S520. At the step S520, a computing operation is performed on the data RY_WB, BY_WB and Y_WB to obtain white balance correcting data. The flow of processes then comes to an end.

Figure 6:
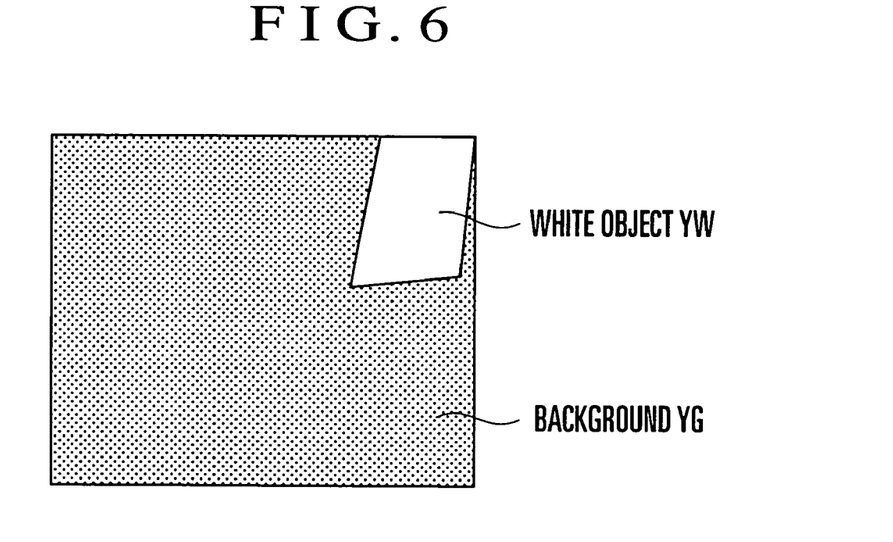
FIG. 6 is an enlarged view showing one block, illustrating a part of an object image, obtained by dividing a picture into a plurality of blocks.

The following describes cases where the use of peak value data is preferable and where the use of mean value data is preferable. FIG. 6 is an enlarged view of one block which is indicated with an arrow in FIG. 12 and described as presenting a problem in the description of the prior art given in the foregoing. In this case, the ratio of an area occupied within one block by a white object to the whole area of the block is small. Therefore, the mean luminance value of the block becomes a low value which is nearly equal to the luminance value YG of green of the background. The peak luminance value of the block is, however, nearly equal to the luminance value YW of the white object. In cases where objects of white and chromatic colors coexist within one and the same picture, the luminance of the object of chromatic color tends to be lower than that of the white object in general. Particularly, the luminance of an object of a green or brown color or the like is much lower than that of a white object. In other words, the ratio of the value YW to the value YG becomes large in such a case. Hence, when the ratio of the peak luminance to the mean luminance is at a level equal to or larger than a certain level, it is highly probable that a part where a peak luminance value is obtained is white. Therefore, it is preferable that the white balance control is performed by using signals of a part where the peak luminance is obtained.

On the other hand, in the event of such an object that does not have much difference between a means luminance value and a peak luminance value, it is assumable that the divided blocks of the picture do not much vary in color. In such a case, the white balance control can be more accurately accomplished by using the mean value of each divided block than by using the peak value which is obtained using a part of the block.

Figure 7:
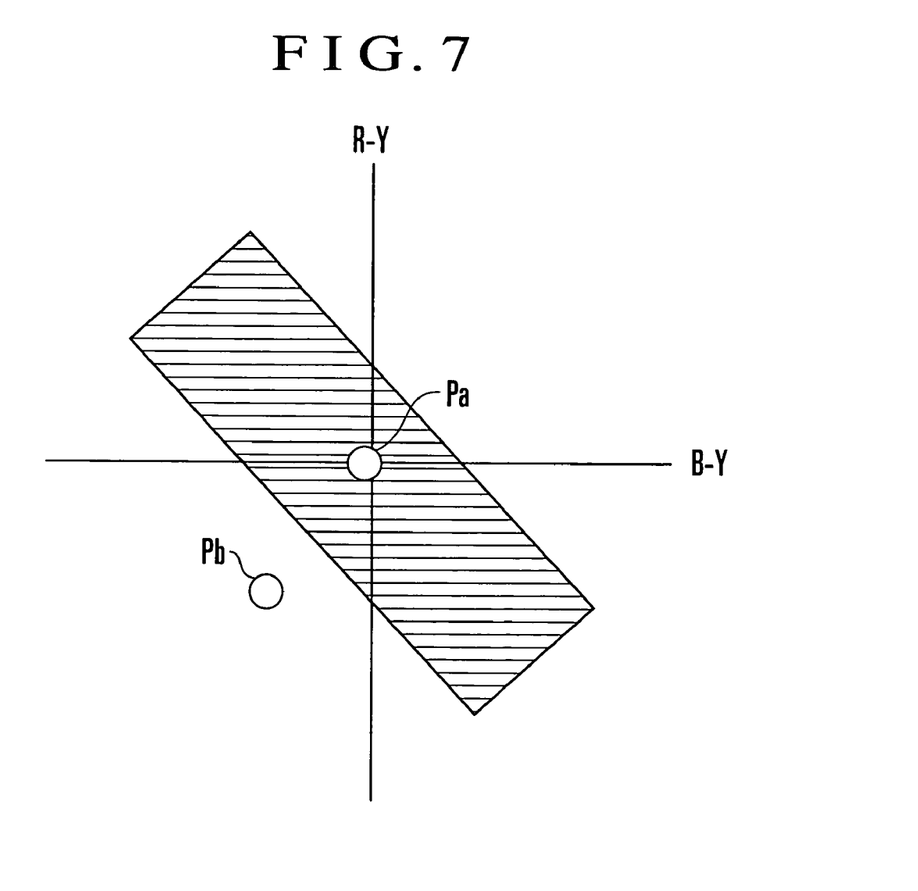
FIG. 7 is a color-difference signal vector diagram showing color-difference signals included in a white extracting range.

When this signal selecting method is employed in performing the white extracting process on such an object that would cause the problem mentioned in the foregoing in accordance with the conventional method, the integral value AVR_Y_P of peak values of the luminance signal becomes considerably larger than the integral value AVR_Y of mean values of the luminance signal. The peak value signals are, therefore, selected for such an object. The signals to be taken in the microcomputer 119 under this condition become as shown in FIG. 7. As shown in FIG. 7, only the signal component Pa for the white object is taken in, while the green signal component Pb for the background is removed. Therefore, the white balance control can be correctly accomplished. Incidentally, the advantageous result can be attained not only for a green background but also for any other background color such as brown, red or the like, so long as the background has low luminance.

In addition, the threshold value SR_Ref for the ratio of the peak value to the mean value does not have to be fixedly set but may be arranged to be variable.

Further, in the above-described embodiment, the picture of a picked-up image is divided into a plurality of blocks and the mean value and the peak value of video signals are obtained for every one of the divided blocks. This arrangement of the embodiment, however, may be changed to obtain a mean value and a peak value of one picture without dividing the picture into a plurality of blocks. In the case of such a modification, a ratio of the peak value to the mean value in one picture is obtained. Then, the white balance control is performed by selecting and using the peak value, if the peak value is found to be not less than a predetermined number of times the mean value. If the peak value is found to be less than the predetermined number of times the mean value, the mean value is selected and used for the white balance control.

It goes without saying that the object of the embodiment of the invention is attainable also by supplying a system or an apparatus with a storage medium (or a recording medium) in which software program codes for carrying out the functions of the embodiment are recorded, and having the program codes read out from the storage medium and executed by a computer (or a CPU or an MPU) of the system or the apparatus. In such a case, the functions of the embodiment are carried out by the program codes thus read out from the storage medium. Then, the storage medium which stores the program codes therein is to be considered to constitute the invention. Further, the program codes read out are not only executed by the computer to carry out the functions of the embodiment but also may be executed either in part or in their entirety on the basis of instructions included in the program codes by an operating system (OS) or the like working on the computer.

In addition, the scope of the invention of course includes also a case where the functions of the embodiment are carried out by writing the program codes read out from the storage medium into a memory provided in a function extending card inserted into a computer or a function extending unit connected to the computer, and, after that, executing actual processes either in part or in their entirety on the basis of instructions of the program codes with a CPU or the like provided in the function extending card or the function extending unit.

In a case where the arrangement of the embodiment is to be applied to a storage medium in the above-stated manner, the storage medium is arranged to store therein program codes corresponding to the processes described in the foregoing with reference to the flow chart of FIG. 5.

According to the arrangement of the embodiment as described above, a white component can be correctly and reliably extracted without being affected by the state of a background, even in a case where an object of shooting includes only a small white part, so that white balance can be accurately corrected. Besides, in a case where the object of shooting includes a large white part, the embodiment is of course capable of carrying out white balance correction in the same manner as the conventional white balance correcting arrangement.

What is claimed is:

1. A white balance correcting device for correcting white balance of a picked-up image signals, comprising:
   an image pickup device which picks-up image signals of an image pick-up plane;
   a dividing part which divides a scope of the image pick up plane into a plurality of blocks;
   a peak value acquiring part which acquires a peak value of brightness and color signal values corresponding to the peak value of brightness obtained in each of all of the plurality of blocks divided by said dividing part;

an average value calculating part which calculates an average value of brightness and average values of color signal values obtained in each of all of the plurality of blocks divided by said dividing part;

a comparison part which makes comparison between brightness information of the average value and the peak value;

a selection part which selects either of the values obtained by said average value calculating part or the values obtained by said peak value acquiring part according to comparison result by said comparison part;

a white balance control part which controls white balance on the basis of the values selected by said selection part; and wherein said comparison part computes comparison between a first integral value obtained by integrating average values obtained by said average value calculating part and a second integral value obtained by integrating peak values obtained in the scope by said peak value acquiring part, and, wherein said selection part selects the values obtained by said peak value acquiring part if the second integral value is not less than a predetermined number of times the first integral value, and said selection part selects the value obtained by said average value calculating part if the second integral value is less than the predetermined number of times the first value.

2. A white balance correcting device according to claim 1, further comprising:

a white determining part which determines whether the average value of color signal values calculated by said average value calculating part and the color signal values corresponding to the peak value of brightness acquired by said peak value acquiring part exist within a white range, wherein said comparison part integrates values which have been determined to exist within the white range by said white determining part, in order to obtain the first integral value and the second integral value.

3. A white balance correcting device according to claim 1, wherein said peak value acquiring part acquires peak values of image signals from signals that have beforehand been subjected to limitation for setting an upper limit to a signal level of the image signals picked-up by said image pick-up device.

4. A white balance correcting device according to claim 1, wherein said peak value acquiring part acquires the peak value from signals that have beforehand been subjected by a low-pass filter to limitation for setting an upper limit to a signal level of the image signals picked-up by said image pick-up device.

5. A white balance correcting device for correcting white balance of a picked-up image signal, comprising:

an inputting part which inputs picked-up image signal of an image pick-up plane;

a dividing part which divides a scope of the image pick up plane into a plurality of blocks;

a peak value acquiring part which acquires a peak value of brightness and color signal values corresponding to the peak value of brightness obtained in each of all of the plurality of blocks divided by said dividing part;

an average value calculating part which calculates an average value of brightness and average values of color signal values obtained in each of all of the plurality of blocks divided by said dividing part;

a comparison part which makes comparison between brightness information of the average value and the peak value;

a selection part which selects either of the values obtained by said average value calculating part or the values obtained by said peak value acquiring part according to the comparison result by said comparison part;

a white balance control part which controls white balance on the basis of the values selected by said selection part; and wherein said selection part selects the values obtained by said peak value acquiring part if the peak value is not less than a predetermined number of times the average value, and said selection part selects the values obtained by said average value calculating part if the peak value is less than the predetermined number of times the average value.

6. A white balance correcting method for correcting white balance of a picked-up image signals, comprising:

picking-up image signals of an image pick-up plane;

dividing a scope of the image pick-up plane into a plurality of blocks;

acquiring a peak value of brightness and color signal values corresponding to the peak value from the image signals obtained in each of all of the plurality of blocks divided in the dividing step;

calculating an average value of brightness and average values of color signal values from the image signals obtained in each of all of the plurality of blocks divided in the dividing step;

making comparison between brightness information of the average value and the peak value;

selecting either of the values obtained in said average value calculating step or the values obtained in said peak value acquiring step according to comparison result;

controlling white balance on a basis of the values selected in said selection step; and wherein, in making comparison, computing a ratio between first integral value obtained by integrating average values obtained in said average value calculating step and a second integral value obtained by integrating peak values obtained in said peak value acquiring step, wherein, the values obtained in said peak value acquiring step is selected by said selection if the second integral value is not less than a predetermined number of times the first integral value, and the values obtained in said average value calculating step is selected by said selection if the second integral value is less than the predetermined number of times the first integral value.

7. A white balance correcting method according to claim 6, further comprising:

determining whether the average value of color signal values calculated in said color average value calculating step and the color signal values corresponding to the peak value acquired in said peak value acquiring step exist within a white range, wherein values which have been determined to exist within the white range in said white determining step are integrated to obtain the first integral value and the second integral value.

8. A white balance correcting method according to claim 6, wherein peak values of the image signals are acquired in said peak value acquiring step from signals that have beforehand been subjected to limitation for setting an upper limit to a signal level of the image signals picked-up in said image picking-up step.

9. A white balance correcting method according to claim 6, wherein peak values of the image signals are acquired in said peak value acquiring step from signals that have beforehand been subjected by a low-pass filter to limitation for setting an upper limit to a signal level of the image signals picked-up in said image picking-up step.

10. A white balance correcting method for correcting white balance of a picked-up image, comprising:
inputting a picked-up image signals of an image pick-up plane;
dividing a scope of the image pick up plane into a plurality of blocks;
acquiring peak value of brightness and color signal values corresponding to the peak value obtained in each of all of the plurality of blocks divided in the dividing step;
calculating an average value of brightness and average values of color signal values obtained in each of all of the plurality of blocks divided in the dividing step;
making comparison between information of the average value and the peak value;
selecting either of the values obtained in said average value calculating step or the values obtained in said peak value acquiring step according to comparison result;
controlling white balance on the basis of the values selected by said selection; and
wherein, the values obtained in acquiring a peak value step is selected by said selection if the peak value is not less than a predetermined number of times the average value in making comparison, and the value obtained in calculating an average value step is selected by said selection if the peak value is less than the predetermined number of times the average value in making comparison.

11. A storage medium which stores therein a program for executing a process for correcting white balance of a picked-up image signals, said process comprising:
picking-up image signals of an image pick-up plane;
dividing a scope of the image pick up plane into a plurality of blocks;
acquiring a peak value of brightness and color signal values corresponding to the peak value from the image signals obtained in each of all of the plurality of blocks divided in the dividing step;
calculating an average value of brightness and average values of color signal values from the image signals obtained in each of all of the plurality of blocks divided in the dividing step;
making comparison between brightness information of the average value and the peak value;
selecting either of the values of obtained in said average value calculating step or the values obtained in said peak value acquiring step according to comparison result; and
controlling white balance on a basis of the values selected in said selection step; and
wherein, in making comparison, computing a ratio between first integral value obtained by integrating average values obtained in said average value calculating step and a second integral value obtained by integrating peak values obtained in said peak value acquiring step,
wherein, the values obtained in said peak value acquiring step is selected by said selection if the second integral value is not less than a predetermined number of times the first integral value, and the values obtained in said average value calculating step is selected by said selection if the second integral value is less than the predetermined number of times the first integral value.

12. A storage medium according to claim 11, wherein said process further comprises:
determining whether the average value of color signal values calculated in said color average value calculating step and the color signal values corresponding to the peak value acquired in said peak value acquiring step exist within a white range;
wherein values which have been determined to exist within the white range in said white determining step are integrated to obtain the first integral value and the second integral value.

13. A storage medium according to claim 11, wherein peak values of the image signals are acquired in said peak value acquiring step from signals that have beforehand been subjected to limitation for setting an upper limit to a signal level of the image signals picked-up in said image picking-up step.

14. A storage medium according to claim 11, wherein peak values of the image signals are acquired in said peak value acquiring step from signals that have beforehand been subjected by a low-pass filter to limitation for setting an upper limit to a signal level of the image signals picked-up in said image picking-up step.

15. A storage medium which stores therein a program for executing a process for correcting white balance of a picked-up image signals, said process comprising:
inputting a picked-up image signal of an image pick-up plane;
dividing a scope of the image pick-up plane into a plurality of blocks;
acquiring a peak value of brightness and color signal values corresponding to the peak value of brightness obtained in each of all of the plurality of blocks divided in the dividing step;
calculating an average value of brightness and average values of color signal values obtained in each of all of the plurality of blocks divided in the dividing step;
making a comparison between brightness information of the average value and the peak value;
selecting either of the values obtained in said average value calculating step or the values obtained in said peak value acquiring step according to the comparison result in said comparison step; and
controlling white balance control part which controls white balance on the basis of the values selected by said selection step; and
wherein said selection step selects the values obtained by said peak value acquiring step if the peak value is not less than a predetermined number of times the average value, and said selection step selects the values obtained by said average value calculating step if the peak value is less than the predetermined number of times the average value.

* * * * *

UNITED STATES PATENT AND TRADEMARK OFFICE
CERTIFICATE OF CORRECTION

| | |
|---|---|
| PATENT NO. | : 6,965,401 B1 |
| APPLICATION NO. | : 09/583251 |
| DATED | : November 15, 2005 |
| INVENTOR(S) | : Hirofumi Takei |

It is certified that error appears in the above-identified patent and that said Letters Patent is hereby corrected as shown below:

Column 4, line 50, delete "White balance" and insert --white balance--

Signed and Sealed this

Fifth Day of December, 2006

JON W. DUDAS
*Director of the United States Patent and Trademark Office*